United States Patent
Abeling et al.

(10) Patent No.: US 11,454,504 B2
(45) Date of Patent: Sep. 27, 2022

(54) METHOD FOR MAPPING A ROUTE SECTION

(71) Applicant: Robert Bosch GmbH, Stuttgart (DE)

(72) Inventors: Peter Christian Abeling, Hannover (DE); Daniel Zaum, Sarstedt (DE); Stefan Werder, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 245 days.

(21) Appl. No.: 16/651,074

(22) PCT Filed: Sep. 21, 2018

(86) PCT No.: PCT/EP2018/075654
§ 371 (c)(1),
(2) Date: Mar. 26, 2020

(87) PCT Pub. No.: WO2019/072524
PCT Pub. Date: Apr. 18, 2019

(65) Prior Publication Data
US 2020/0263997 A1     Aug. 20, 2020

(30) Foreign Application Priority Data
Oct. 13, 2017 (DE) .......................... 102017218397.7

(51) Int. Cl.
*G01C 21/32* (2006.01)
*G01C 21/36* (2006.01)
(Continued)

(52) U.S. Cl.
CPC .......... *G01C 21/32* (2013.01); *G01C 21/3602* (2013.01); *G01S 7/003* (2013.01);
(Continued)

(58) Field of Classification Search
CPC ..... G01C 21/32; G01C 21/3602; G01S 7/003; G01S 13/862; G01S 13/867; G01S 13/89;
(Continued)

(56) References Cited

U.S. PATENT DOCUMENTS

| 6,711,493 B1* | 3/2004 | Andrews | G08G 1/0104 340/904 |
| 9,103,671 B1* | 8/2015 | Breed | G01S 17/931 |
| 2017/0123421 A1* | 5/2017 | Kentley | G06Q 10/00 |

FOREIGN PATENT DOCUMENTS

| DE | 102008012661 A1 | 2/2009 |
| DE | 102012212740 A1 | 5/2014 |

(Continued)

OTHER PUBLICATIONS

International Search Report for PCT/EP2018/075654, dated Jan. 4, 2019.

*Primary Examiner* — Ig T An
(74) *Attorney, Agent, or Firm* — Norton Rose Fulbright US LLP; Gerard Messina

(57) ABSTRACT

A method for mapping a route section. The method includes providing a central mapping server equipped with a server-side communication interface; providing at least one fleet vehicle of a vehicle fleet equipped with at least one sensor which is suitable for detecting mapping data, and with a vehicle-side communication interface, the server-side communication interface and the vehicle-side communication interface being configured to exchange data; making a mapping decision by decision-making logic implemented on the mapping server, and transmitting an individual mapping request which is based on the mapping decision to the at least one fleet vehicle, it being possible for the mapping request to include different pieces of information for individual fleet vehicles; and transmitting mapping data from the at least one fleet vehicle to the mapping server as a function (Continued)

of the individual mapping request and the use of the mapping data during the mapping of the route section.

7 Claims, 1 Drawing Sheet

(51) Int. Cl.
*G01S 7/00* (2006.01)
*G01S 13/86* (2006.01)
*G01S 13/89* (2006.01)
*G01S 15/89* (2006.01)
*G05D 1/02* (2020.01)

(52) U.S. Cl.
CPC .......... *G01S 13/862* (2013.01); *G01S 13/867* (2013.01); *G01S 13/89* (2013.01); *G01S 15/89* (2013.01); *G05D 1/0274* (2013.01); *G05D 2201/0213* (2013.01)

(58) Field of Classification Search
CPC .................. G01S 15/89; G05D 1/0274; G05D 2201/0213
See application file for complete search history.

(56) References Cited

FOREIGN PATENT DOCUMENTS

| | | | | |
|---|---|---|---|---|
| DE | 102013107960 A1 | | 1/2015 | |
| JP | 2012089088 A | * | 5/2012 | ............... G08G 1/00 |
| JP | 2012089088 A | | 5/2012 | |
| JP | 2014215204 A | | 11/2014 | |
| JP | 2016095831 A | | 5/2016 | |

\* cited by examiner

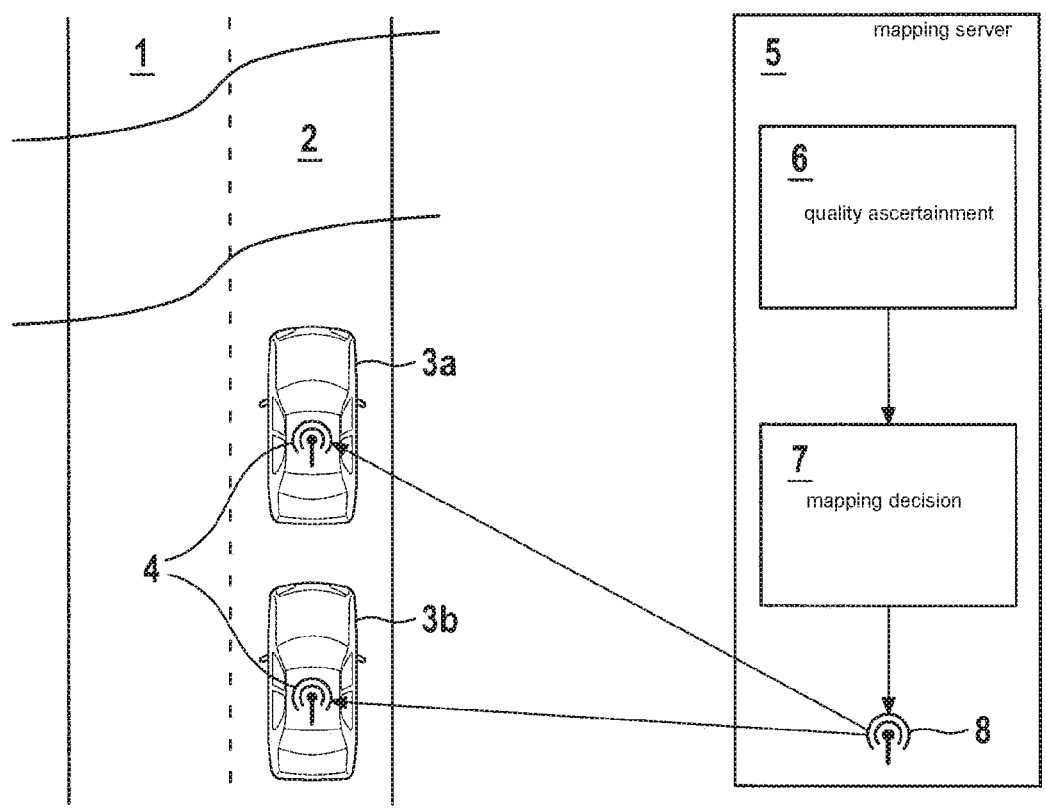

METHOD FOR MAPPING A ROUTE SECTION

FIELD

The present invention relates to a method for mapping a route section.

BACKGROUND INFORMATION

A plurality of methods and systems for mapping traveled roads with the aid of the sensors (for example, cameras, radar sensors, ultrasonic sensors, etc.) installed in the vehicles are described in the related art. In addition to the described sensors, these systems also include a radio interface for transmitting the measured sensor data to a server (for example, connectivity unit). In this way, entire vehicle fleets may map their surroundings with the aid of the vehicle sensors by transmitting their sensor data, for example, to a server.

The sensor data are collected on the server, and a map for the relevant road segment is generated from the data from multiple trips and/or vehicles. The transmission of such "fleet mapping data" and the generation of a map from these data are part of the related art, it proving disadvantageous that the transmission of such sensor data for the mapping generally results in large data volumes and high costs associated therewith.

SUMMARY

It is an object of the present invention to provide an improved method for mapping a route section having reduced data transmission costs.

The object may be achieved in accordance with example embodiments of the present invention. Advantageous embodiments of the present invention are described herein.

According to one aspect of the present invention, an example method for mapping a route section is provided, in which a central mapping server is provided, the central mapping server being equipped with a server-side communication interface. Furthermore, at least one, preferably multiple fleet vehicle(s) of a vehicle fleet is/are provided, the at least one fleet vehicle being equipped with at least one server suitable for detecting mapping data and with a vehicle-side communication interface, the server-side communication interface and the vehicle-side communication interface being configured to exchange data. Thereafter, a mapping decision is made on the part of a decision-making logic implemented on the mapping server, and an individual mapping request which is based on the mapping decision is transmitted to the at least one fleet vehicle, it being possible for the mapping request to include different pieces of information for individual fleet vehicles. The mapping data are transmitted from the at least one fleet vehicle to the mapping server as a function of the individual mapping request and the use of the mapping data during the mapping of the route section. In this way, the respective mapping vehicles of the fleet will only transmit sensor data when these are truly needed to create and/or update a map.

Since the decision-making logic on a central server decides as to which areas are to be mapped and when sufficient data are available for a mapping process, only the first vehicles entering the selected territory in each case transmit their data. Additional following vehicles, which are also driving around as potential mapping vehicles, are no longer needed for the selected case. Even though a larger fleet of mapping vehicles results in a faster mapping of a road segment, in this way it does not result in higher data transmission costs from the perspective of the overall system.

The individual mapping request advantageously includes the information to the at least one fleet vehicle to transmit the mapping data to the mapping server or to cease the transmission of mapping data.

In one preferred variant of the present invention, the decision-making logic includes the check as to whether a sufficient volume of and/or sufficiently precise mapping data exist on the mapping server for a territory to be mapped. In this way, the decision-making logic makes the decision as to whether additional sensor data are transmitted for a road segment or whether sufficient data already exist for creating or updating the map.

Advantageously, two example technical variants of this server-based control logic are as follows:

In the case that the mapping decision includes the information that a sufficient volume of mapping data exists for the territory to be mapped, the fleet vehicles situated in the territory to be mapped are not to transmit any mapping data. This ensures that all vehicles a priori do not transmit any data to the server. Advantageously, they receive the instruction from the server to only do so for certain territories, and when sufficient data exist for a territory, the instruction for the transmission of the data is revoked. In this way, the amount of transmitted data is reduced, which represents an advantage compared to the related art, in which, in principle, all vehicles permanently transmit their data for a section, even though these may possibly no longer be required to carry out a mapping.

As an alternative, in the case that the volume of mapping data for the territory to be mapped is not sufficient, the mapping decision includes the information that at least one fleet vehicle situated in the territory to be mapped is to transmit mapping data.

The decision-making logic preferably takes into consideration which sensor types are present on the particular fleet vehicles, the mapping decision and the individual mapping request being at least partially based on the available sensor types, and the individual mapping request including the information as to which sensor types are to be used for ascertaining the mapping data for the mapping server.

In one preferred specific embodiment, the individual mapping request includes the information that the mapping data are to be collected by the at least one fleet vehicle and stored locally on a suitable memory of the at least one fleet vehicle until a further mapping request takes place.

In accordance with example embodiments of the present invention, it is advantageous if a mapping request is transmitted to the at least one fleet vehicle when the at least one fleet vehicle exits the territory to be mapped. In this way, it may be ensured that, if sufficient data exist for a territory, it is communicated to all further vehicles situated in the corresponding territory or entering it that no data transmission is necessary. The vehicles thus do not have to transmit any further sensor data, whereby, on the one hand, the data transmission costs are reduced and, on the other hand, the data transmission costs are rendered independent of the utilized fleet size.

When making the mapping decision, the decision-making logic advantageously takes into consideration which costs are incurred as a result of the transmission of the mapping data by individual fleet vehicles, the mapping decision being at least partially based on a cost minimization.

In one preferred embodiment variant of the present invention, when making the mapping decision, the decision-making logic takes further boundary conditions which are relevant for multiple or individual fleet vehicles into consideration, the boundary conditions including the group made up of weather conditions, lighting conditions, traffic density and vehicle speed.

In an example embodiment, the point in time of the revocation of a mapping instruction for a vehicle fleet is thus (only) dependent on the quality of the map derived from the sensor data (new creation or updating), which allows the instruction to be recalled sooner, and thus enables significant cost savings with respect to the data volume to be transmitted, compared to existing approaches (time, number of vehicles).

A further object of the present invention is to provide an example device for mapping a route section, including a central mapping server, the central mapping server being equipped with a server-side communication interface. The device furthermore includes at least one, preferably multiple, fleet vehicle(s), the at least one fleet vehicle being equipped with at least one sensor which is suitable for detecting mapping data and with a vehicle-side communication interface, and with a vehicle-side control unit, the server-side communication interface and the vehicle-side communication interface being configured to exchange data. The mapping server is configured to make a mapping decision and to transmit an individual mapping request which is based on the mapping decision to the at least one fleet vehicle, it being possible for the mapping request to include different pieces of information for individual fleet vehicles. The vehicle-side control unit, the at least one sensor and the vehicle-side communication interface are configured to collect mapping data as a function of the individual mapping request and to transmit them to the mapping server.

The mapping server and the control unit of the at least one fleet vehicle are advantageously configured to carry out the method as recited in one of the described claims.

The at least one sensor preferably includes a sensor of the group of the cameras, the radar sensors and the ultrasonic sensors.

Additional features, application options and advantages of the present invention are derived from the following description of exemplary embodiments of the present invention, which are shown in the FIGURES. It should be noted that the illustrated features are only of a descriptive nature and may also be used in combination with features of other above-described refinements and are not intended to restrict the present invention in any way.

BRIEF DESCRIPTION OF THE DRAWING

The present invention is described in greater detail hereafter based on one preferred exemplary embodiment, identical reference numerals being used for identical features.

FIG. 1 schematically shows in one example a route section including two traffic lanes for use of the method according to the present invention.

DETAILED DESCRIPTION OF EXAMPLE EMBODIMENTS

FIG. 1 shows a route section 1 including two traffic lanes, the number of traffic lanes, in principle, being arbitrary. A change 2 compared to a map already present on a mapping server 5 exists on route section 1. Mapping server 5, which is illustrated in the right portion of FIG. 1, is equipped with a server-side communication interface 8, which may be a radio interface, for example.

Change 2, which may, for example, be a change of the routing, the parking facility, the roadway markings or the like, is not yet reflected in the map present on the mapping server, which means potential hazard sources or at least inaccuracies in the navigation of vehicles in route section 1. A renewed mapping of route section 1 is thus necessary.

According to the present invention, an example method according to the present invention for mapping route section 1 includes the provision of fleet vehicles $3a$, $3b$. In principle, the number of fleet vehicles $3a$, $3b$ is arbitrary. Each of fleet vehicles $3a$, $3b$ includes at least one, in general, however, an arbitrary number of sensors (not shown), suitable for detecting mapping data and a vehicle-side communication interface 4 for wirelessly transmitting the mapping data ascertained by the sensors to mapping server 5.

As is shown in the FIGURE by corresponding connecting lines, server-side communication interface 8 and vehicle-side communication interfaces 4 are configured to exchange data.

The utilized sensors may, in principle, be arbitrary sensors suitable for detecting pieces of mapping information, for example cameras, radar sensors, ultrasonic sensors or GPS modules, in general not all fleet vehicles $3a$, $3b$ being equipped with the same sensors. Mapping data shall be understood to mean, for example, objects which were identified with the aid of a camera, radar reflections and/or objects detected by the radar sensor, and position data from a GPS receiver. Based on the mapping data transmitted to mapping server 5, an up-to-date mapping of route section 1 may then take place on the server side according to generally known methods.

Costs are incurred during the described transmission of the mapping data from fleet vehicles $3a$, $3b$ to mapping server 5, which are dependent on the transmitted data volume. Existing systems are parameterized in such a way that fleet vehicles $3a$, $3b$ permanently transmit all their mapping data ascertained by the sensors, which results in very high data transmission costs. In addition, potential storage media which are used to buffer the data in the vehicle (for example in the case of dead spots or "offline operation") are comprehensively subject to high loads across all fleet vehicles.

According to the present invention, a decision-making logic is thus implemented on mapping server 5, which is configured to make a mapping decision which establishes whether and which of fleet vehicles $3a$, $3b$ transmit mapping data, and when. As a result of the mapping decision, mapping requests are transmitted to fleet vehicles $3a$, $3b$, it being possible for the mapping requests to include different pieces of information for individual fleet vehicles $3a$, $3b$.

The decision-making logic implemented on mapping server 5 may be based, for example, on simple, geographically enclosing rectangles which are defined for the territory in which a change was identified. The mapping requests according to the present invention to the connected fleet vehicles $3a$, $3b$ may now include that fleet vehicles $3a$, $3b$ transmit their mapping data as soon as they enter such a rectangle (also referred to as a "bounding box"), and end the data transmission when leaving the rectangle. The monitoring as to when fleet vehicles $3a$, $3b$ enter the rectangles may, for example, take place using the vehicle-internal GPS modules or in a centralized manner on the server processor.

According to the present invention, the transmission of the mapping data from fleet vehicles $3a$, $3b$ to mapping server 5 thus takes place as a function of the individual mapping request, which, in turn, is established by the decision-making logic implemented on mapping server 5.

This method already reduces the data transmission costs considerably; however, this variant of the method according to the present invention does not yet take into consideration the fact that sufficient data for a remapping may already be present on mapping server 5. Other spatial or topological criteria (e.g., traffic volume, news situations, traffic jam information, weather reports etc.) may be taken into consideration in the decision-making logic to make the mapping decision and thus, ultimately, control the start and end of the data transmission by individual fleet vehicles 3a, 3b.

According to one further specific embodiment of the present invention, an intelligent granting and revocation of the mapping instruction is introduced. The decision-making logic implemented on mapping server 5 includes two steps, which are carried out sequentially.

In a first step 6 "quality ascertainment," which is indicated in the right portion of FIG. 1, all previously existing sensor data for change 2 are loaded using a suitable method, and the quality of the map resulting therefrom is ascertained. The quality ascertainment is carried out with the aid of suitable algorithms, all present sensor data and/or the present, i.e., outdated, map for the observed route section 1 being taken into consideration.

In a second step 7 "mapping decision," the mapping decision as to whether additional mapping data are required for the considered section and thus already granted mapping requests are maintained, or whether the present mapping data are already sufficient for mapping the spot, and the existing mapping inquiries for route section 1 may thus be revoked, is made with the aid of the previously calculated quality indicator.

To make the mapping decision, it is possible, in addition to the previously ascertained quality indicators, to also include further information sources, such as weather information or historical data of the same route section. The mapping decision is made in the process with the aid of a defined threshold value, which corresponds to a minimum quality of the generated map section and which must be exceeded. The revocation of a mapping inquiry is transmitted to fleet vehicles 3a, 3b after the mapping decision via the server-side communication interface 8. Fleet vehicles 3a, 3b may, accordingly, begin to transmit the mapping data or cease it. When this specific embodiment of the method according to the present invention is used, the mapping decision is thus made at a point in time that further mapping data are no longer needed from fleet vehicles 3a, 3b.

The decision-making logic may come both to the conclusion that sufficient data for a remapping or an update are already present, and to the conclusion that it is not possible to map route section 1 even with a very large number of data sets. The latter may be established within the scope of a conventional convergence examination of the mapping progress based on the mapping data.

The decision in this regard is made in step 7 "mapping decision." As a result, it is possible for the first fleet vehicle 3a passing route section 1 to still receive a mapping request including the information to transmit mapping data to mapping server 5, and the second, following fleet vehicle 3b passing the same route section 1 to receive a mapping request including the information not to transmit mapping data to mapping server 5, since the mapping instruction was revoked during the time between the two passes.

If the mapping data are always only transmitted after a passage through the considered route section, a revocation of the mapping instruction may also still be carried out during the mapping trip. The collected mapping data are then afterwards not transmitted to mapping server 5, but deleted.

What is claimed is:

1. A method for mapping a route section using (a) a central mapping server that maintains a digital map subdivided by bounding boxes into a plurality of areas and that is equipped with a server-side communication interface and (b) a plurality of vehicles of a vehicle fleet, each of the vehicles of the vehicle fleet being equipped with at least one sensor configured to detect mapping data and a vehicle-side communication interface, wherein the server-side communication interface and the vehicle-side communication interface being configured to exchange data, the method comprising:
   determining by the mapping server that the digital map requires an update in one of the plurality of areas;
   in response to the determination, transmitting, by the mapping server, a respective mapping request to each of a subset of the vehicles of the vehicle fleet that are at the one of the plurality of areas requesting respective mapping data detected by the at least one sensor of the respective vehicle in the area,
   transmitting, by a first one of the vehicles of the subset and to the mapping server and due to the respective mapping request from the mapping server, respective mapping data recorded by the first one of the vehicles of the subset while in the one of the plurality of areas in response to the first one of the vehicles of the subset exiting from the area;
   in response to the mapping server receiving the mapping data transmitted by the first one of the vehicles of the subset, transmitting, by the mapping server and to a second one of the vehicles of the subset that has not yet exited from the area, a request revocation instructing the second one of the vehicles of the subset not to transmit to the mapping server mapping data recorded by the second one of the vehicles of the subset in association with the respective mapping request previously transmitted by the mapping server to the second one of the vehicles of the subset; and
   using, by the mapping server, the mapping data transmitted by the first one of the vehicles of the subset during the mapping of the route section;
   wherein each of the vehicles of the subset is configured to hold off transmission of mapping data to the mapping server in response to the respective mapping requests until after the respective vehicle has left the area.

2. The method as recited in claim 1, further comprising checking, by the mapping server, whether a sufficient volume of and/or sufficiently precise mapping data exist on the mapping server for the area, based on which the mapping server determines to transmit the request revocation.

3. The method as recited in claim 1, wherein the mapping server takes into consideration which sensor types are present on the respective ones of the vehicles of the vehicle fleet, the respective mapping requests being at least partially based on the sensor types and including information as to which sensor types are to be used for ascertaining the mapping data for the mapping server.

4. The method as recited in claim 1, wherein, when making the respective mapping requests, the mapping server takes into consideration respective costs which would be incurred by the transmission of the mapping data by respective ones of the vehicles of the vehicle fleet, the mapping requests being at least partially based on a cost minimization of the respective costs.

5. The method as recited in claim 1, wherein the mapping requests are made taking boundary conditions into consideration, the boundary conditions including: a weather condition, and/or a lighting condition, and/or traffic density, and/or vehicle speed.

6. A system for mapping a route section, the system comprising:
- a central mapping server that maintains a digital map subdivided by bounding boxes into a plurality of areas; and
- a plurality of vehicles of a vehicle fleet, each of the vehicles of the vehicle fleet being equipped with at least one sensor configured to detect mapping data;

wherein:
- the mapping server is configured to:
  - determine that the digital map requires an update in one of the plurality of areas; and
  - in response to the determination, transmit to each of a subset of the vehicles of the vehicle fleet that are at the one of the plurality of areas a respective mapping request requesting respective mapping data detected by the at least one sensor of the respective vehicle in the area;
- a first one of the vehicles of the subset is configured to, due to the respective mapping request from the mapping server, transmit to the mapping server, respective mapping data recorded by the first one of the vehicles of the subset while in the one of the plurality of areas in response to the first one of the vehicles of the subset exiting from the area;
- the mapping server is configured to:
  - in response to the mapping server receiving the mapping data transmitted by the first one of the vehicles of the subset, transmit to a second one of the vehicles of the subset that has not yet exited from the area, a request revocation instructing the second one of the vehicles of the subset not to transmit to the mapping server mapping data recorded by the second one of the vehicles of the subset in association with the respective mapping request previously transmitted by the mapping server to the second one of the vehicles of the subset; and
  - use the mapping data transmitted by the first one of the vehicles of the subset during the mapping of the route section; and
- each of the vehicles of the subset is configured to hold off transmission of mapping data to the mapping server in response to the respective mapping requests until after the respective vehicle has left the area.

7. The system as recited in claim 6, wherein the at least one sensor is a sensor of the following group: a camera, and/or a radar sensor, and/or an ultrasonic sensor.

* * * * *